US010117271B2

(12) United States Patent
Ljung

(10) Patent No.: US 10,117,271 B2
(45) Date of Patent: Oct. 30, 2018

(54) CONTENTION WINDOW ADJUSTMENT IN UNLICENSED CELLULAR RADIO NETWORK

(71) Applicant: Sony Mobile Communications Inc., Tokyo (JP)

(72) Inventor: Rickard Ljung, Helsingborg (SE)

(73) Assignee: SONY MOBILE COMMUNICATIONS INC., Tokyo (JP)

(*) Notice: Subject to any disclaimer, the term of this patent is extended or adjusted under 35 U.S.C. 154(b) by 158 days.

(21) Appl. No.: 14/947,757

(22) Filed: Nov. 20, 2015

(65) Prior Publication Data

US 2017/0086225 A1 Mar. 23, 2017

Related U.S. Application Data

(63) Continuation of application No. PCT/EP2015/071856, filed on Sep. 23, 2015.

(51) Int. Cl.
*H04B 17/318* (2015.01)
*H04W 74/08* (2009.01)
*H04W 16/14* (2009.01)
*H04W 56/00* (2009.01)
*H04W 74/00* (2009.01)

(52) U.S. Cl.
CPC ...... *H04W 74/0808* (2013.01); *H04B 17/318* (2015.01); *H04W 16/14* (2013.01); *H04W 74/0816* (2013.01); *H04W 56/0005* (2013.01); *H04W 74/004* (2013.01)

(58) Field of Classification Search
CPC . H04W 16/14; H04W 56/0005; H04W 74/08; H04B 17/318
See application file for complete search history.

(56) References Cited

U.S. PATENT DOCUMENTS

| 2011/0019721 | A1 | 1/2011 | Diener et al. | |
| 2014/0078970 | A1* | 3/2014 | Guo | H04W 72/005 370/329 |
| 2014/0198642 | A1 | 7/2014 | Barriac et al. | |

(Continued)

OTHER PUBLICATIONS

"WF on CW adjustment based on HARQ-ACK feedback", 3GPP TSG RAN WG1 #82, Beijing, China, Aug. 24-28, 2015, R1-154959, Agenda item: 7.2.4.1.

(Continued)

*Primary Examiner* — Raj Jain
(74) *Attorney, Agent, or Firm* — Tucker Ellis LLP

(57) ABSTRACT

A base station of a cellular radio communications network configured to operate in an unlicensed radio band, comprising a radio transceiver connected to an antenna, and a controller including a processor and a memory holding computer program code. The processor is configured to execute the computer program code to realize a machine for determining a size for a contention window, within which the base station may transmit data from the transceiver to a radio terminal operating in the network; receiving a signal from the terminal, comprising an indication of occupancy of a radio channel, as detected by the terminal; adjusting the contention window size dependent on the indication of occupancy of the radio channel; transmitting data to the terminal within the adjusted contention window.

7 Claims, 2 Drawing Sheets

(56) References Cited

U.S. PATENT DOCUMENTS

| | | | | |
|---|---|---|---|---|
| 2015/0358904 A1* | 12/2015 | Kwon | ............... | H04W 52/0206 |
| | | | | 370/252 |
| 2016/0066195 A1* | 3/2016 | Moon | ................... | H04W 16/14 |
| | | | | 455/454 |
| 2017/0048718 A1* | 2/2017 | Kim | ....................... | H04W 16/14 |
| 2017/0048916 A1* | 2/2017 | Yoo | ...................... | H04B 17/318 |
| 2017/0086225 A1* | 3/2017 | Ljung | ............... | H04W 74/0808 |

OTHER PUBLICATIONS

Huawei et al: "Triggering mechanism for contention window size adaptation", 3GPP DRAFT; RI-153782, 3rd Generation Partnership Project (3GPP), Mobile Competence Centre ; 650, Route Des Lucioles ; F-06921 Sophia-Antipolis Cedex; France, vol. RAN WG1, No. Beijing, China; Aug. 24, 2015-Aug. 28, 2015, Aug. 23, 2015 (Aug. 23, 2015), XP051001228, Retrieved from the Internet: URL:http://www.3gpp.org/ftp/Meetings_3GPP_SYNC/RAN1/Docs/ [retrieved on Aug. 23, 2015].

ZTE: "Contention window size adaptation for DL LBT in LAA", 3GPP Draft; R1-154768 Contention Window Size Adaptation for DL LBT in LAA, 3rd Generation Partnership Project (3GPP), Mobile Competence Centre ; 650, Route Des Lucioles ; F-06921 Sophia-Antipolis Cedex, vol. RAN WG1, No. Beijing, China; Aug. 24, 2015-Aug. 28, 2015, , Aug. 30, 2015 (Aug. 30, 2015), XP051041627,Retrieved from the Internet: URL:http://www.3gpp.org/ftp/tsg_ran/WG1_RL1/TSGR182/Docs/ [retrieved on Aug. 30, 2015].

Qualcomm et al: "WF on CW adjusted based eNB sensing", 3GPP Draft; WF on CW Adjusted Based on ENB SENSING_LG2, 3rd Generation Partnership Project (3GPP), Mobile Competence Centre ; 650, Route Des Lucioles ; F-06921 Sophia-Antipolis Cedex ; France, vol. RAN WG1, No. Beijing, China; Aug. 24, 2015-Aug 28, 2015, Aug. 30, 2015 (Aug. 30, 2015), XP051045069, Retrieved from the Internet: URL:http://www.3gpp.org/ftp/tsg_ran/WG1_RL1/TSGR182/Docs/ [retrieved on Aug. 30, 2015] p. 2, lines 1-12.

International Search Report and Written Opinion; dated Jun. 8, 2016; issued in International Patent Application No. PCT/EP2015/071856.

* cited by examiner

CONTENTION WINDOW ADJUSTMENT IN UNLICENSED CELLULAR RADIO NETWORK

TECHNICAL FIELD

The solutions proposed herein relate to contention handling in a cellular radio network, such as a Long Term Evolution (LTE) network. More specifically, a solution is proposed for adapting a contention window of such a radio network operating in an unlicensed radio band, in response to a trigger indicating data collisions.

BACKGROUND

Traditionally, cellular radio network systems were designed to run over frequencies exclusively licensed to specific mobile operators, and to gain this access right in a certain country or region carriers have often had to pay large amounts of money. This has been the case both 3G systems such as WCDMA, and indeed also for LTE.

Wi-Fi, on the other hand, i.e. Wireless LAN under IEEE standard 802.11, is a radio system that lacks the cellular design of e.g. LTE. In such a WLAN, several terminals may establish connection and exchange data with an access point base station without having to be registered to any carrier. In addition, any WLAN may be set up to make use of any part of an unlicensed radio band. Since different WLANs can overlap, and often do, there will be a risk for collisions between data packets sent at a common channel. This is handled by algorithms for collision avoidance, such as CSMA/CA (Carrier Sense Multiple Access with Collision Avoidance), which are covered in the 802.11 specification. This system is, in a sense, more free. More specifically, it offers a possibility of very high bandwidth for any user.

Preparation is ongoing within 3GPP to start sending LTE signals over unlicensed frequencies, and trials have already been carried out. In the 5 GHz band, in which WLAN already may operate, there's more than 400 MHz of unlicensed spectrum available in most countries, and while no one will be able to use all 400 MHz at one time, an average subscriber who walks into range of an unlicensed LTE cell might get twice as much spectrum as in the licensed spectrum, according to certain estimates. The use of LTE on unlicensed bands has generally been considered for public places where there is coverage from licensed band LTE operation but where additional capacity would be beneficial, such as indoor cells or outdoor hot spots. Contrary to concern, the intention in the 3GPP work is not to define a standalone system that could be used in e.g. home environments, since there are existing solutions such as femto cell or Wi-Fi for that case. The proposed solutions are in fact designed to require co-existence of a licensed LTE connection. Unlicensed LTE is therefore named LAA (Licensed Assisted Access), an extra spectrum resource, especially on e.g. the 5 GHz frequency band, which can complement licensed bands. The technology and specifications developed will be a step towards mobile terminals using any kind of spectrum that's available, which is expected to continue in next-generation 5G networks.

SUMMARY

In a radio system where all terminals basically have the same right to access a channel, rules must be provided for deciding inter alia how collisions shall be avoided and how bandwidth can be fairly distributed among coexisting terminals, but also to be able to detect if a radar system is using the band. The solution to these challenges is sometimes referred to as Clear Channel Assessment (CCA) or as Listen-Before-Talk (LBT), which means that is not always possible to transmit immediately if the intended channel is occupied. When operating with downlink only on the unlicensed band of e.g. an LTE system, the LTE base station (eNodeB) can perform most of the necessary operations to ensure reliable communications, including checking whether an intended unlicensed channel is free from other use. Preferably, the eNodeB should aim to select a channel that does not have another network operating on it with a high interference level, but the situation may arise that an eNodeB is not the sole device operating on that channel. As a consequence, there may be a risk for collision of data packets on the channel.

When attempting to handle transmission on a channel where colliding traffic may occur, the basic rule is to try again if transmission fails. The reason for failed transmission may be that the intended receiving LTE terminal receives transmission from two different eNodeBs substantially simultaneously, such that it is not capable of hearing both, or at least not discern them properly. For a transmitting eNodeB, this may be gathered from a NACK (Not ACKnowledged) signal sent back from the terminal, or from the lack of either an ACK or NACK signal. When attempting transmission, or re-attempting, the feature of a contention window (CW) is used, and within that CW, the eNodeB will make a transmission attempt. In order to not risk that also other eNodeBs will transmit at the same time, a rule may be applied that an eNodeB shall transmit at any time within the CW, rather than at the end of the CW. Preferably, a random or pseudo-random point in time within the CW is selected, so as to further minimize the risk for a collision.

Should transmission still fail, a process of adapting the CW may follow. A simple strategy is to employ simple exponential increase of the CW, meaning that the CW is doubled every time retransmission is required. However, this may be seen as an overly defensive strategy that will not provide the best transmission possibilities. It is thus an object of the invention to provide a more effective solution for adapting a contention window in a radio network operating in an unlicensed frequency band.

According to a first aspect, a method is provided that is carried out in a base station of a cellular radio communications network configured to transmit data to a terminal in an unlicensed radio band, comprising the steps of:

determining a contention window, within which to transmit data between the base station and a terminal;

receiving a signal from the terminal, comprising an indication of occupancy of a radio channel, as detected by the terminal;

adjusting the contention window size dependent on the indication of occupancy of the radio channel;

transmitting data to the terminal within the adjusted contention window.

In one embodiment, the indication of occupancy represents measured signal strength on the channel in the terminal within a measurement period.

In one embodiment, the step of adjusting the contention window size includes the steps of:

comparing the indication of occupancy to a first threshold value; and increasing the contention window size responsive to determining that the indication of occupancy levels or exceeds the first threshold.

In one embodiment, the step of adjusting the contention window size includes the steps of:

comparing the indication of occupancy to a first threshold value, and, responsive to determining that the indication of occupancy levels or exceeds the first threshold;

increasing the contention window size based on establishing a metric on a degree of operation by the base station on the channel;

comparing the metric with a second threshold value; and determining that the degree of base station operation levels or exceeds the second threshold.

In one embodiment, the step of adjusting the contention window size includes the steps of:

comparing the indication of occupancy to a first threshold value, establishing a metric on a degree of operation by the base station on the channel;

comparing the metric with a second threshold value; and increasing the contention window size if either the indication of occupancy levels or exceeds the first threshold value, or the degree of operation by the base station levels or exceeds the second threshold.

In one embodiment, the step of establishing a metric on a degree of operation by the base station includes measuring a number or degree of busy slots or periods on the channel within an observation window.

In one embodiment, the step of adjusting the contention window size includes the steps of:

comparing the indication of occupancy to a first threshold value, and, responsive to determining that the indication of occupancy levels or exceeds the first threshold;

increasing the contention window size based on establishing a metric on a degree or number of NACK (not acknowledged) feedback values received on the channel in respect of a predetermined period;

comparing the metric with a second threshold value; and determining that the degree or number of NACK feedback values levels or exceeds the second threshold.

In one embodiment, the step of adjusting the contention window size includes the steps of:

comparing the indication of occupancy to a first threshold value, establishing a metric on a degree or number of NACK (not acknowledged) feedback values received on the channel in respect of a predetermined period;

comparing the metric with a second threshold value; and increasing the contention window size if either the indication of occupancy levels or exceeds the first threshold value, or the degree or number of NACK feedback values received levels or exceeds the second threshold.

According to a second aspect, a base station of a cellular radio communications network is provided, configured to operate in an unlicensed radio band, comprising a radio transceiver connected to an antenna, and a controller including a processor and a memory holding computer program code, wherein the processor is configured to execute the computer program code to realize a machine for determining a size for a contention window, within which the base station may transmit data from the transceiver to a radio terminal operating in the network;

receiving a signal from the terminal, comprising an indication of occupancy of a radio channel, as detected by the terminal;

adjusting the contention window size dependent on the indication of occupancy of the radio channel;

transmitting data to the terminal within the adjusted contention window.

In one embodiment, the indication of occupancy represents measured signal strength on the channel in the terminal within a measurement period.

In one embodiment, the processor in the base station is configured to execute the computer program code to realize a machine for carrying out the steps of any of the preceding embodiments.

According to a third aspect, a radio terminal configured to communicate with a cellular radio communications network in an unlicensed radio band is provided, the terminal comprising a radio transceiver connected to an antenna, and a controller including a processor and a memory holding computer program code, wherein the controller is configured to control the radio transceiver to measure received signal strength within a measurement period on a frequency band of a channel in the unlicensed radio band, on which channel the terminal is connected to a base station, and wherein the controller is configured to establish a measurement on channel occupancy based on aggregated signal strength received from any radio transmitter on that frequency band within the measurement period, the controller further being configured to control the transceiver to report the measurement on channel occupancy to the base station for contention window adjustment.

In one embodiment, the measurement period is a predetermined number of sub-frames of an LTE system.

BRIEF DESCRIPTION OF THE DRAWINGS

Various embodiments of the invention will be described below with reference to the accompanying drawings, in which FIG. 1 schematically illustrates a system setup for a cellular radio communications network configured to transmit data to a terminal in an unlicensed radio band.

DETAILED DESCRIPTION

For the sake of simplicity, the following description will be focused on embodiments within LTE. In such a system, a radio network base station is denoted an eNodeB and a terminal is called a user equipment UE. While embodiments of the solutions drawn up herein target deployment in LTE, it should be understood that the solutions as such are not bound to LTE. For this reason, the general terms base station and terminal will henceforth also be used. It may also be noted that a terminal need not be a mobile phone, but can be any device, mobile or stationary, capable of operating by radio communication with the radio network through the base station.

Figure 1:
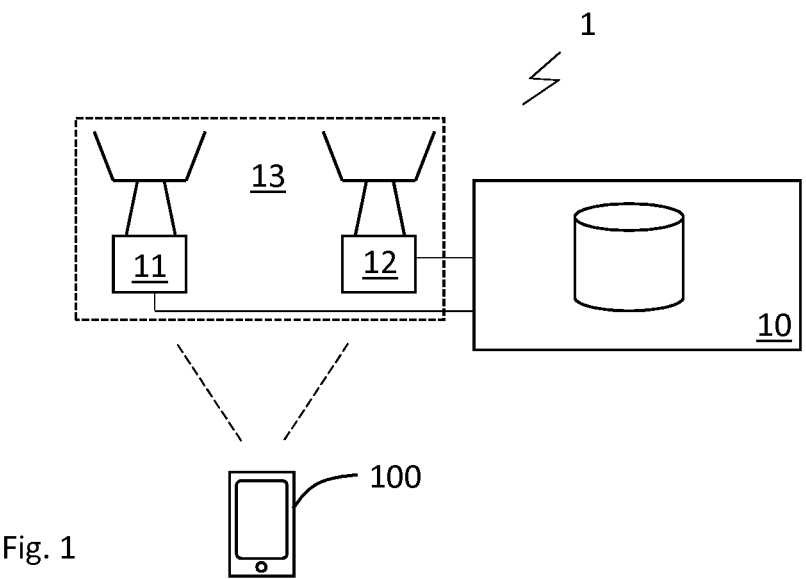

FIG. 1 schematically illustrates a cellular radio communications network 1, such as an LTE network. A core network part 10 is typically includes gateways and other nodes, which connect to other communication networks, including the Internet (not shown). In order to establish a link to a mobile, or stationary for that matter, radio terminal 100, a number of base stations employed, of which two 11, 12 are shown in the drawing. The system of FIG. 1 may represent an LTE system configured for Licensed Assisted Access (LAA). In such a network 1, a base station 11 may be configured to communicate with a terminal 100 in a licensed spectrum, which is dedicated to the operator of the network 1. In addition, a base station 12 may be employed for communicating with the terminal connected to the base station 11, to provide an aggregated carrier in the unlicensed spectrum. Deployments of unlicensed LTE (U-LTE) may be in the form of a small cell base station 13 with both LTE radio 11 and LTE-U 12 radio in it, as indicated by the dotted square in the drawing. The supplemental carrier in the unlicensed band may be selected by the base station 13 dynamically based on congestion in the unlicensed spectrum. Such base station 13 may also have a Wi-Fi radio in it.

An LTE terminal 100 capable of operating on the unlicensed band needs to be able to make the necessary measurements to support unlicensed band operation, including providing feedback when the terminal 100 is in the coverage area of a base station 12 transmitting within the unlicensed spectrum. Once the connection is activated to allow use on the unlicensed band, an existing Channel Quality Information (CQI) feedback will allow the base station 13 to determine what kind of quality could be achieved on the unlicensed band compared to the licensed band. The downlink only mode is particularly suited for situations where data volumes are dominated by downlink traffic. The uplink transmission (full TDD operation) from a terminal 100 operating on the unlicensed band requires more features, both in the terminal 100 as well as in the base station 12/13, compared to the existing licensed band operation. These extra features are needed to meet the specific requirements of transmission on the unlicensed band, including enabling the LBT feature and radar detection in the terminal 100 side. While in the downlink only mode, these features are needed only on the base station side.

When attempting to transmit data on a channel in the unlicensed spectrum, there will inevitably always be a risk for collisions with data transmitted from other sources in the area. In the LBT (Listen Before Talk) process, a contention window is therefore applied, within which transmission may be carried out. Different processes for adjusting the contention window will also need to be employed, particularly when traffic is intense. Presently, two different proposals have been discussed within 3GPP for contention window size (CWS) adjustment for PDSCH, i.e. the Physical Downlink Shared Channel in LTE, which are to be studied further:

CWS adjustment based on base station channel sensing based metrics, or

CWS adjustment based on HARQ ACK/NACK feedback.

However, the present proposition for LAA in 3GPP release 13 is downlink only, and none of these solutions will provide an optimum solution for CWS adjustment, since the basis for the decision making does not necessarily correspond to the reason for having to apply CWS adjustment. On the one hand, a decision for CWS adjustment based on ACK/NACK feedback will only take into consideration whether a data packet has been received or not. However, it does not necessarily mean that the NACK was caused by a collision. Other reasons for the failure to properly receive a data packet may e.g. be channel fading. On the other hand, using base station (eNB) sensing will reflect the radio situation sensed at the base station side, while the collision will occur on the terminal side. For these reasons, it is hereby proposed that CWS adjustment is configured to take channel occupancy as perceived by the intended recipient terminal into consideration. In LAA tit is possible to consider a terminal (UE) measurement for channel occupancy. This measurement can consider the amount of time where the RSSI (received signal strength indicator) is above a certain threshold. This measurement may be used to improve the CWS adjustment, since there would be a more accurate information source than e.g. UE ACK/NACK or eNB sensing information only. Hence, in various embodiments it is furthermore proposed that CWS adjustment based on eNB sensing or ACK/NACK transmissions takes terminal channel occupancy measurement into account.

Figure 2:
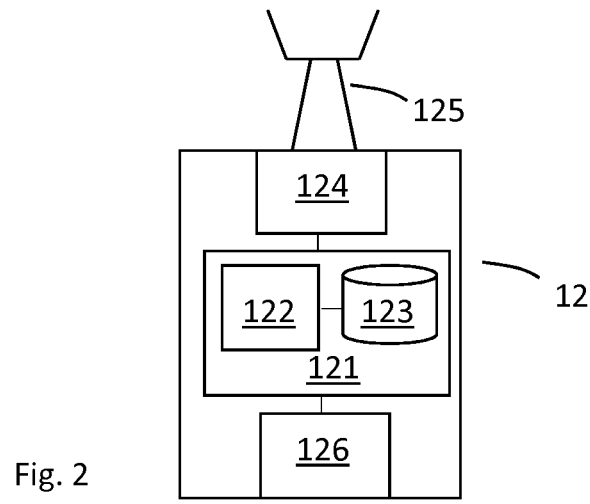
FIG. 2 schematically illustrates functional blocks of a base station for operating in an unlicensed radio band in a network of FIG. 1.

FIG. 2 shows a schematic representation of an embodiment of a base station 12 for operation in the unlicensed spectrum, in a LAA network as shown in FIG. 1. A method may thus be carried out in the base station 12, which forms part of a cellular radio communications network 1, configured to transmit data to a terminal 100 in an unlicensed radio band. The base station 12 may comprise a controller 121, including a processor 122, and a memory 123 containing computer program code, which can be executed by the processor 122. Such code may be firmly stored in the memory 123, or downloaded from through a connected network and temporarily stored in the memory 123. A radio transceiver 124 is connected to an antenna 125, for transmission and reception of signals to and from various radio terminals. The antenna need not, as such, form part of the base station 12. In addition, a data communication port 126 is provided for connecting to other nodes (not shown) of a radio access network, such as an LTE Mobility Management Entity (MME) and further to a core system. Again, it may be noted that the base station 12 may be incorporated in a common entity 13 with a licensed band base station 11 of the same radio network 1, as indicated in FIG. 1.

When a data packet is to be transmitted, e.g. on a PDSCH, a contention window (CW) will be applied. The size of the CW may be determined in units of time, or indirectly as a number of segments, such as e.g. time slots or sub-frames. A current size of the CW may be determined as a setting from e.g. a memory 123 in or connected to the base station 12. The processor 122 is configured to execute the computer program code stored in memory 123 to realize a machine for adjusting the CWS (CW size). A present value for CWS, within which the base station 12 may transmit data from the transceiver 124 to a radio terminal 100 operating in the network 1, may be stored in a memory, e.g. the memory 123 in the base station. That present value may be a preset minimum value, or an increased value set responsive to prior CWS adjustment. Typically, CWS may be increased by adjustment after assessment that there is a high presence or probability of collisions, or decreased responsive to determination that there is a low degree of collisions, or simply that a timer for increased CWS has expired.

The transceiver 124 is configured to receive signals from a connected terminal 100, by means of the antenna 125. More specifically, the base station may be configured to receive a signal from the terminal 100, comprising an indication of occupancy of a radio channel, as detected by that terminal 100. The controller 121 may furthermore be configured to adjust the CWS dependent on the indication of occupancy of the radio channel. In one embodiment, increase of CWS may be determined, by execution of the controller 121, responsive only to channel occupancy as perceived and reported by the terminal 100, or by one or more other terminals communicatively connected to the base station 12. Alternatively, channel occupancy may be taken as one factor for determining increase of CWS by the controller 121. If the CWS is to be adjusted by increase, an exponential increase may be employed, such that the CW is doubled in size. Other increase procedures may be employed, though. When a data packet is to be transmitted from the base station 12 to the terminal 100, the transceiver will send the data packet at a point in time within the adjusted CW, such as at a randomly selected point in time within the CW. Further embodiments of the base station will be described below mainly with reference to the process steps carried out in the base station, such as by execution by the processor 122, of computer program code present in the memory 123.

Figure 3:
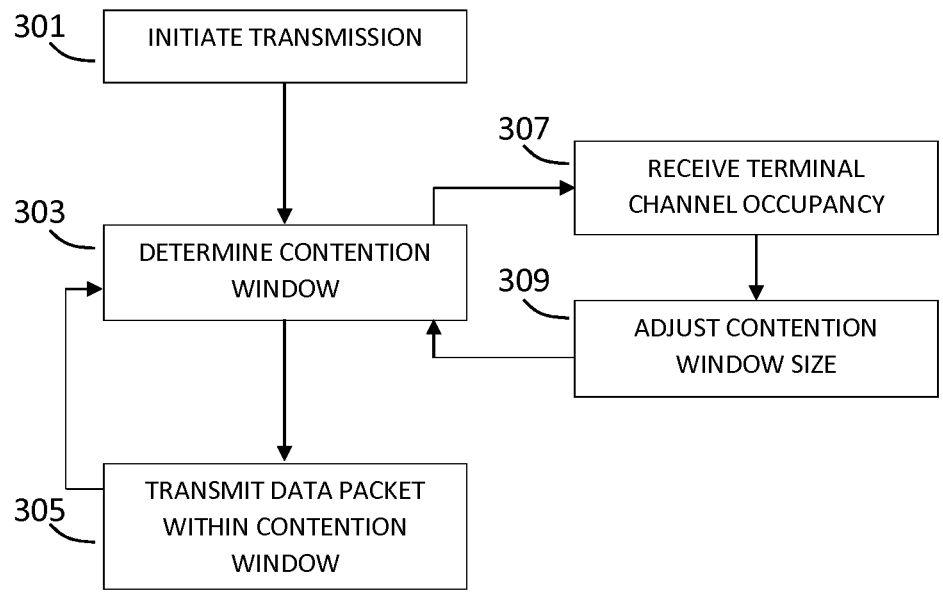
FIG. 3 shows process steps of a method carried out in a cellular radio communications network configured to transmit data to a terminal in an unlicensed radio band.

FIG. 3 illustrates method steps carried out in an embodiment of a base station 12 of a cellular radio communications network 1 configured to transmit data to a terminal 100 in an unlicensed radio band. The method may comprise the following steps, outlined with reference to the drawing.

In a step 301, which may be included in or precede the method steps of an embodiment, transmission may be initiated from a base station 12 to a terminal 100. This step may include any required preparation of the transmission of data, such as any required handshake process and selection of a channel on an unlicensed frequency band, and startup of a communication session involving transmission of data. Examples of such a session may include browsing, downloading of data, streaming media, receiving messages, accessing stored files in the cloud etc.

In step 303, when a data packet is to be transmitted, a contention window for the transmission will be determined, within which to transmit data between the base station 12 and the terminal 100. This may e.g. be carried out by retrieving a present CW setting, including CW size and potentially also starting point, such as from a memory 123. A contention window determined in the base station 12 may be applicable only for downlink transmission, i.e. to a terminal 100, or both for uplink and downlink.

In a step 305, a step of transmitting data to the terminal 100 is carried out, within the contention window.

When a new transmission is to be carried out, such as a new data packet or a new range of data, the contention window may again be determined, as indicated by the arrow from step 303 back to step 305 in the drawing. At that point, the contention window may have been adjusted, e.g. due the occurrence of collisions on the channel in question. In accordance with one embodiment, this may be carried out based on channel occupancy.

In a step 307, the base station 12 receives a signal from the terminal 100, comprising an indication of occupancy of a radio channel, as detected by the terminal.

In step 309, the contention window size may be adjusted dependent on the indication of occupancy of the radio channel, as received in at least step 307. When transmission is to be executed in step 305, for which the contention window is determined in step 303, the contention window size may thus have been adjusted in a step 309, with respect to a preceding data transmission.

In one embodiment, the indication of occupancy as received in step 307 represents measured signal strength on the channel in the terminal within a measurement period. The measurement period may e.g. be a number of time slots, or even a predetermined number of LTE sub-frames. More specifically, the channel occupancy as measured in the terminal 100 is based on all energy perceived within the range of the selected channel. This means that this measurement will represent a situation of occupancy which is actually perceived at the intended recipient, i.e. the terminal 100.

Figure 4:
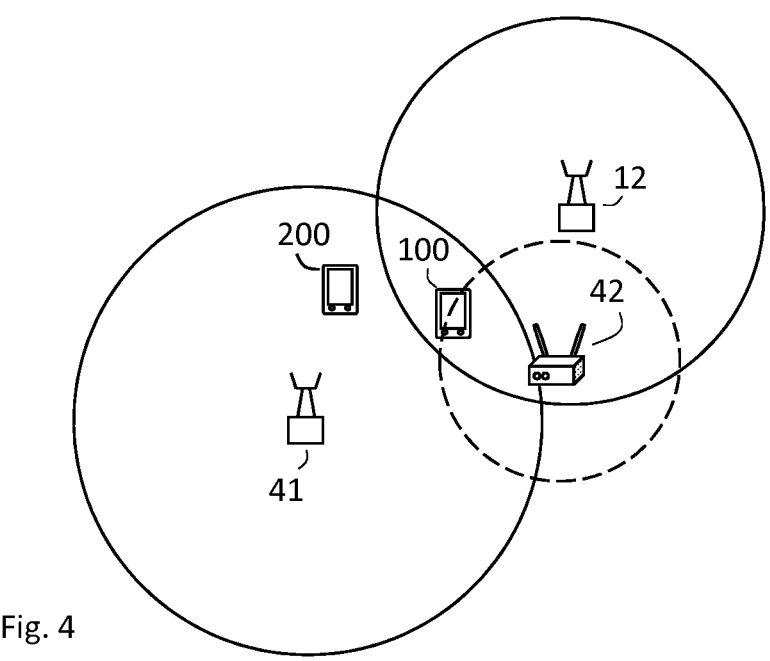
FIG. 4 schematically illustrates various overlapping radio networks operating on a common frequency band, as sensed by a terminal.

FIG. 4 illustrates by way of example a scenario in which a terminal 100 is connected to a radio base station 12 configured according to the embodiments described herein. The base station 12 is configured to transmit data to the terminal 100 on a channel in an unlicensed part of the radio spectrum, and a cell range for the base station 12 is schematically indicated by a circle surrounding the base station 12. In addition, a second radio base station 41 may cover an area, as indicated, which overlaps the position where the terminal is present. This second radio base station may e.g. form part of another LAA radio network, such as a radio network run by a different operator. As an example situation, a Wi-Fi hotspot 42 is also indicated, with its coverage area indicated by a dashed circle. Also the Wi-Fi hotspot, or access point, 42 is within reception range of the terminal 100. However, the scenario of FIG. 4 means that the base station 12 cannot know, by detection, that the other system base stations 41 and 42 cover the terminal 100. In accordance with the solution proposed herein, though, the terminal 100 will be able to detect received energy from at least any of the base stations 12, 41 and 42. In addition, other terminals within reception range of terminal 100, such as a second terminal 200 which communicates with the second base station 41, may transmit on the same channel on which the terminal 100 is measuring. Also such transmission by other terminals may be detected when measuring channel occupancy in the terminal 100. Since the risk for reception failure in the terminal 100 due to collisions will be caused by radio signal level present at the terminal 100, the channel occupancy level measured in the terminal will provide a suitable candidate for a basis on which to take a decision to adjust CWS.

Figure 5:
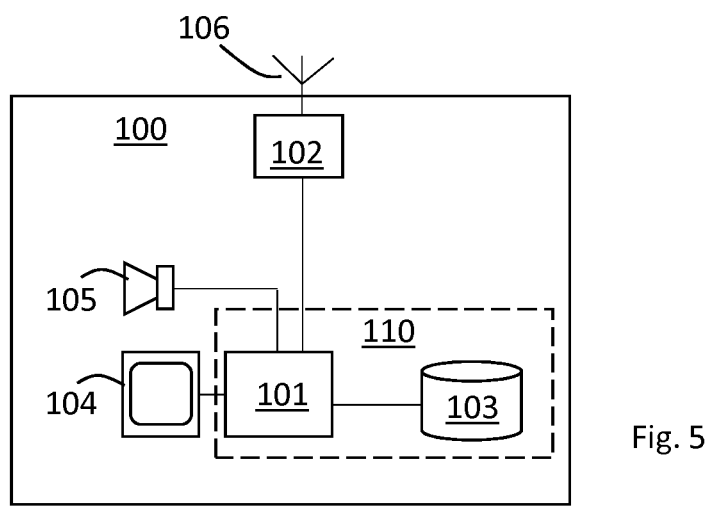
FIG. 5 schematically illustrates functional blocks of a radio terminal for operating in an unlicensed radio band in a network of FIG. 1.

FIG. 5 illustrates an embodiment of a radio terminal 100, configured to communicate with a cellular radio communications network 1 in an unlicensed radio band, according to any of the embodiment disclosed herein. The terminal 100 may comprise a radio transceiver 102 connected to an antenna 106, and a controller 110 including a processor 101 and a memory 103, holding computer program code for execution by the processor 101. The terminal may optionally also include a user interface, including an audio interface 105 and/or a display 104, both of which may be used for both user input and output. Even physical keys maybe included (not shown). The controller 110 is configured to control the radio transceiver 102, which may form part of or be connected to a modem, to measure received signal strength within a measurement period on a frequency band of a channel in the unlicensed radio band on which channel the terminal is connected to a base station 12. The controller 110 is further configured to establish a measurement on channel occupancy based on aggregated signal strength received from any radio transmitter on that frequency band within the measurement period, as outlined above. The controller 110 is further configured to control the transceiver 102 to report the measurement on channel occupancy to the base station 12 for contention window adjustment.

Returning to FIG. 3, the step 307 of receiving terminal channel occupancy may be carried out periodically, such as every predetermined number of sub-frames. As an example, the total received signal strength may be measured in the terminal 100 for a measurement period, and a channel occupancy value dependent on that measurement may then be transmitted to the base station 12.

In one embodiment, the terminal 100 may be configured to periodically, continuously or intermittently measure perceived signal strength, and to make an assessment of channel occupancy. That assessment may include comparing the measured energy to a threshold level. The terminal 100 may thereby be configured to transmit channel occupancy only if the threshold level has been met or exceeded. As an alternative embodiment, the assessment may be carried out with respect to a previously determined level of channel occupancy, e.g. as stored in a memory 103 in the terminal 100. The terminal 100 may thereby be configured to transmit an indication of channel occupancy only when substantially changing or deviating from the previous level, or e.g. with respect to a norm value.

In one embodiment, reception of terminal channel occupancy is carried out responsive to the base station 12 signaling a request to that effect, to the terminal 100. Such a request may in one embodiment include a request to send one channel occupancy indication, or to start sending channel occupancy, e.g. for a predetermined period or until a request to stop sending channel occupancy has been sent from the base station 12 to the terminal 100.

In one embodiment, channel occupancy is measured in the terminal 100 only on channel on which base station 12 and terminal 100 communicates. Alternatively, the measurement may be carried out by the terminal 100 on a plurality of channels in the unlicensed spectrum.

The terminal channel occupancy indication received from the terminal 100 may be stored in the base station 12 when received, e.g. in a memory 123. The stored channel occupancy indication may then be retrieved from memory in step 307, responsive to the need for determining the contention window of step 303, at which the CWS may be adjusted according to step 309.

In one embodiment, the step 309 of adjusting the CWS may include the steps of comparing the indication of occupancy to a first threshold value; and increasing the contention window size responsive to determining that the indication of occupancy levels or exceeds the first threshold. In such an embodiment, CWS adjustment in the form of an increase of the window is based directly on the channel occupancy determined by the recipient terminal 100. The increase as such may e.g. be carried out by doubling the CWS. Other bases for taking a decision on increasing the CWS may be implemented to complement the channel occupancy criteria, though, as will be outlined below.

According to one aspect discussed in 3GPP, CWS adjustment or adaptation may be based on observation of busy and idle slots sensed on the channel at the base station 12, within an observation window. In one embodiment, CWS adjustment may be based on a metric which calculates number of busy periods within the observation window, where a busy period is the total time the channel is occupied between two idle CCA slots. Alternative metrics may be number of busy periods, or number of busy slots, divided by total number of CCA slots within the observation window.

An adaptation rule for CWS may involve the following:
If the metric is larger than a threshold, then increase the CWS;
If the metric is smaller than a threshold, then reduce or even reset the CWS.

The threshold may be predefined value, or a value derived from current CWS value or from properties of the observation window. The observation window may e.g. be the time between two downlink PDSCH transmissions, or the time from when a random counter, such as an ECCA counter, is drawn, to the time when the counter either reaches zero or to the time that the packet is transmitted. The observation window may exclude the time period that the base station voluntarily freezes the counter during the ECCA procedure. There may in addition be other conditions under which CWS is reset to its minimum value.

This aspect of determining a degree of how busy the base station senses the channel to be, may be employed in a method for adjusting the CWS, which is also based on channel occupancy as reported from the terminal. In one embodiment, such a method may include the step of comparing the indication of occupancy to a first threshold value in the base station, and, responsive to determining that the indication of occupancy levels or exceeds that first threshold, proceeding with a process for increasing CWS based on base station sensing. The level of the first threshold may be determined based on how aggressive it is determined that the CWS adjustment procedure shall be. A high threshold means that the CWS will not be increased even when a high degree of collisions occur, whereas a lower level means a faster back-off to larger CWS when collisions appear on the channel, as detected by the terminal. The continued process for base station sensing may include steps carried out by the controller 121 of the base station 12. In one step a metric on a degree of operation by the base station on the channel is established. This may be employed according to any one of the metrics regarding busy slots or periods within the observation window, as outlined above. That metric is then compared with a second threshold value, and if it is determined that the degree of base station operation levels or exceeds the second threshold, CWS may be increased. This embodiment is consequently based on determining to increase CWS based on base station sensing on the channel only if a measurement on channel occupancy received from the terminal indicates occupancy over a certain degree or level. Hence, both criteria shall be met.

A variant of this embodiment may be based on the requirement that either base station sensing, or channel occupancy as detected and reported by the terminal, indicate that CWS shall be increased, by means of process steps carried out by the controller 121 of the base station 12. Such an embodiment may thus include the step of comparing the indication of occupancy to a first threshold value in the base station. In addition, a metric on a degree of operation by the base station 12 on the channel is established, e.g. in a manner as outlined for the preceding embodiment. That metric is then compared with a second threshold value. A positive determination to increase CWS is then reached if either the indication of occupancy levels or exceeds the first threshold value, or the degree of operation by the base station levels or exceeds the second threshold. This embodiment is therefore based on determining to increase CWS if any of either channel occupancy received from the terminal indicates occupancy over a certain degree or level, or the channel business sensed by the base station levels or exceed a certain threshold. Hence, only one of said criteria has to be met.

According to another aspect discussed in 3GPP, CWS adjustment or adaptation may be based on feedback from terminals in the network, received upon transmission attempt from the base station 12. Such feedback may be denoted HARQ (hybrid automatic repeat request) ACK/NACK. A CWS adjustment based on terminal ACK/NACK feedback would enable an adjustment based on successful decoding ratio in the terminals, but the ACK/NACK statistics may not fully indicate the contention/congestion situation. It is therefore suggested herein to add criteria relating to channel occupancy as measured and received from the terminals to ACK/NACK based CWS adjustment. More specifically, terminal measurements on RSSI channel occupancy may be detected to obtain a metric, which the base station takes into account for ACK/NACK based CWS adjustment, in embodiments of this aspect. Some variants of ACK/NACK based adjustment determination include the following three.

An indication to increase CWS may be obtained if all of the considered HARQ-ACK feedback values corresponding to a single sub-frame, e.g. a latest downlink (DL) sub-frame or the first DL sub-frame of the latest DL transmission burst, are NACK. Otherwise, an indication is obtained that the CWS may be reset to a minimum value.

An alternative indication to increase CWS may be obtained if at least one of the considered HARQ-ACK feedback values corresponding to a single sub-frame, e.g. according to the aforementioned examples, is NACK. Otherwise, an indication is obtained that the CWS may be reset to a minimum value.

Another alternative indication to increase CWS may be obtained if at least Z % of the HARQ-ACK feedback values within a predefined window are NACK, where Z may be a suitably selected percentage value. Otherwise, an indication is obtained that the CWS may be reset to a minimum value.

With reference to this second aspect of indicating increase of CWS dependent on ACK/NACK response, it is hereby proposed that the terminal reported channel occupancy metric is used as a baseline (gating) requirement for increasing the CWS. Hence, the different alternative indications above are considered for increasing the CWS only if the channel occupancy is reported over a certain threshold level. In such an embodiment, a process may include steps carried out by the controller 121 of the base station 12, wherein a step of adjusting the CWS size includes the step of comparing the indication of occupancy to a first threshold value. As noted, the level of this first threshold may be determined based on how aggressive it is determined that the CWS adjustment procedure shall be. A high threshold means that the CWS will not be increased even when a high degree of collisions occur, whereas a lower level means a faster back-off to larger CWS when collisions appear on the channel, as detected by the terminal. Responsive to determining that the indication of occupancy levels or exceeds the first threshold, the controller 121 may proceed to increase the CWS based on an ACK/NACK metric, as disclosed. Such a process may include establishing a metric on a degree or number of NACK feedback values received on the channel in respect of a predetermined period. The controller 121 may proceed to compare the metric with a second threshold value, and to increase the CWS if it is determined that the degree or number of NACK feedback values levels or exceeds the second threshold. This embodiment is consequently based on determining to increase CWS based on NACK feedback only if a measurement on channel occupancy received from the terminal indicates occupancy over a certain degree or level. Hence, both criteria shall be met.

A variant of this embodiment may be based on the requirement that either NACK feedback sensing, or channel occupancy as detected and reported by the terminal, indicate that CWS shall be increased, by means of process steps carried out by the controller 121 of the base station 12. Such an embodiment may thus include the step of comparing the indication of occupancy to a first threshold value in the base station 12. In addition, a metric on a degree or number of NACK feedback values received on the channel in respect of a predetermined period is established, e.g. in accordance with any of the alternatives given for the preceding embodiment. That metric is then compared with a second threshold value. A positive determination to increase CWS is then reached if either the indication of occupancy levels or exceeds the first threshold value, or the degree or number of NACK feedback values received levels or exceeds the second threshold. This embodiment is therefore based on determining to increase CWS if any of either channel occupancy received from the terminal indicates occupancy over a certain degree or level, or the degree or number of NACK feedback values received levels or exceed a certain threshold. Hence, only one of said criteria has to be met.

The foregoing description of embodiments provides illustration, but is not intended to be exhaustive or to limit the embodiments to the precise form disclosed. Accordingly, modifications to the embodiments described herein may be possible. It may also be noted that the terms "a," "an," and "the" are intended to be interpreted to include one or more items, and the phrase "based on" is intended to be interpreted as "based, at least in part, on," unless explicitly stated otherwise. The term "and/or" is intended to be interpreted to include any and all combinations of one or more of the associated items.

The embodiments described herein may be implemented in many different forms of software, firmware, and/or hardware. For example, a process or a function may be implemented as "logic" or as a "component." This logic, such as controllers 121 or 110, may include hardware (e.g. a processor) or a combination of hardware and software. The embodiments have been described without reference to the specific software code since software can be designed to implement the embodiments based on the description herein and the accompanying drawings. Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to the memories 123 and 103, forming part of or being connected to the controllers. The terms "comprise," "comprises" or "comprising," as well as synonyms thereof, when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the appended claims. More particularly, it may be noted that various embodiments disclosed may be combined. The specification and drawings are accordingly to be regarded as illustrative rather than restrictive.

The invention claimed is:

1. A method carried out in a base station of a cellular radio communications network configured to transmit data to a terminal in an unlicensed radio band, comprising the steps of:
   determining a contention window, within which to transmit data between the base station and a terminal;
   receiving a signal from the terminal, comprising an indication of occupancy of a radio channel, as detected by the terminal;
   establishing a metric on a number of Not Acknowledged (NACK) feedback values received on the radio channel in respect to a predetermined period of time;

comparing the indication of occupancy to a first threshold value;

in response to determining that the indication of occupancy meets or exceeds the first threshold value, comparing the metric with a second threshold value;

in response to determining that the metric meets or exceeds the second threshold value, increasing the contention window size; and transmitting data to the terminal within the increased contention window.

2. The method of claim 1, wherein the indication of occupancy represents measured signal strength on the radio channel in the terminal within a measurement period.

3. The method of claim 1, further comprising:

comparing the indication of occupancy to the first threshold value, and, responsive to determining that the indication of occupancy levels or exceeds the first threshold;

establishing a second metric on a degree of operation by the base station on the radio channel;

comparing the second metric with a third threshold value; and in response to determining that the second metric meets or exceeds the second threshold, further increasing the contention window size.

4. The method of claim 3, wherein the step of establishing a metric on a degree number of operation by the base station includes measuring a number busy slots or periods on the radio channel within an observation window.

5. A base station of a cellular radio communications network configured to operate in an unlicensed radio band, comprising a radio transceiver connected to an antenna, and a controller including a processor and a memory holding computer program code, wherein the processor is configured to execute the computer program code to realize a machine for:

determining a size for a contention window, within which the base station may transmit data from the transceiver to a radio terminal operating in the network;

receiving a signal from the terminal, comprising an indication of occupancy of a radio channel, as detected by the terminal;

establishing a metric on a number of Not Acknowledged (NACK) feedback values received on the radio channel in respect to a predetermined period of time;

comparing the indication of occupancy to a first threshold value;

in response to determining that the indication of occupancy meets or exceeds the first threshold value, comparing the metric with a second threshold value;

in response to determining that the metric meets or exceeds the second threshold, increasing the contention window size; and transmitting data to the terminal within the increased contention window.

6. The base station of claim 5, wherein the indication of occupancy represents measured signal strength on the channel in the terminal within a measurement period.

7. A method carried out in a base station of a cellular radio communications network configured to transmit data to a terminal in an unlicensed radio band, comprising the steps of:

determining a contention window, within which to transmit data between the base station and a terminal;

receiving a signal from the terminal, comprising an indication of occupancy of a radio channel, as detected by the terminal;

comparing the indication of occupancy to a first threshold value;

in response to determining that the indication of occupancy meets or exceeds the first threshold value, (i) establishing a metric on a number of Not Acknowledged (NACK) feedback values received on the radio channel in respect to a predetermined period of time, and (ii) comparing the metric with a second threshold value, in response to determining that the metric meets or exceeds the second threshold, increasing the contention window size; and transmitting data to the terminal within the increased contention window.

* * * * *